US006896412B2

(12) United States Patent
Begue

(10) Patent No.: US 6,896,412 B2
(45) Date of Patent: May 24, 2005

(54) BEARING ASSEMBLY INCLUDING ROLLING ELEMENTS

(75) Inventor: Jean Begue, Orleans (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 10/328,017

(22) Filed: Dec. 26, 2002

(65) Prior Publication Data

US 2003/0142892 A1 Jul. 31, 2003

(30) Foreign Application Priority Data

Jan. 14, 2002 (FR) .............................................. 02 00367

(51) Int. Cl.⁷ .............................................. F16C 33/80
(52) U.S. Cl. ...................................... 384/477; 384/488
(58) Field of Search ................................. 384/477, 480, 384/488; 277/409, 411, 412, 430

(56) References Cited

U.S. PATENT DOCUMENTS 2,014,859 A      9/1935   Mitchell, Jr.
3,663,077 A  *   5/1972   Nakamura et al. .......... 384/473
3,774,982 A  *  11/1973   Nakamura et al. .......... 384/480
4,257,617 A      3/1981   Hill

FOREIGN PATENT DOCUMENTS

| DE | 30 26 835 A1 | 2/1982 |
| DE | 32 11 715 A1 | 10/1983 |
| EP | 0 289 610 A1 | 11/1988 |
| JP | 61-170251 | 7/1986 |

* cited by examiner

Primary Examiner—Thomas R. Hannon
(74) Attorney, Agent, or Firm—Oliff & Berridge, PLC

(57) ABSTRACT

The present invention relates to an assembly comprising:
- a cage,
- rolling elements placed inside the cage,
- a shaft passing through said cage and supported by the rolling elements, the cage having sealing parts extending on either side of the rolling elements,
- the two spaces formed between said sealing parts and the shaft,
- at least one communication path between the two spaces.

30 Claims, 4 Drawing Sheets

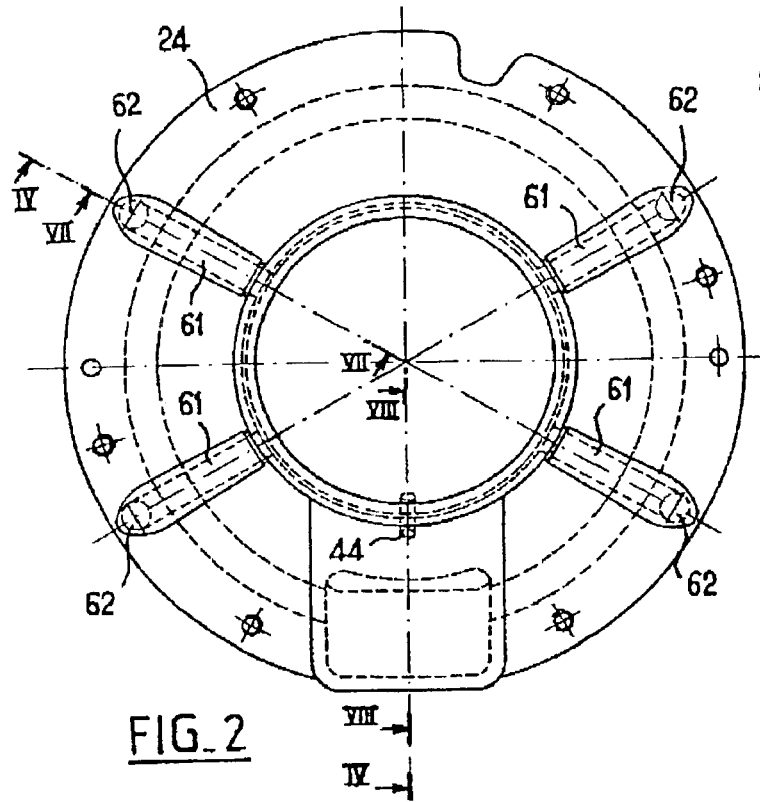
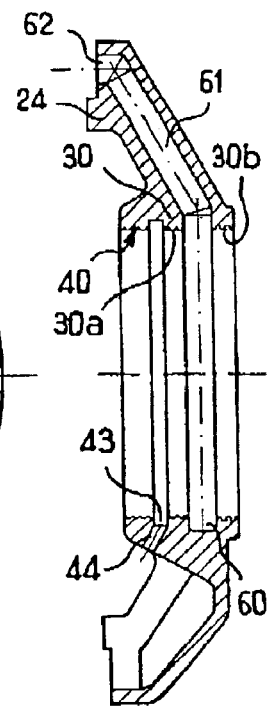
FIG. 2
FIG. 4
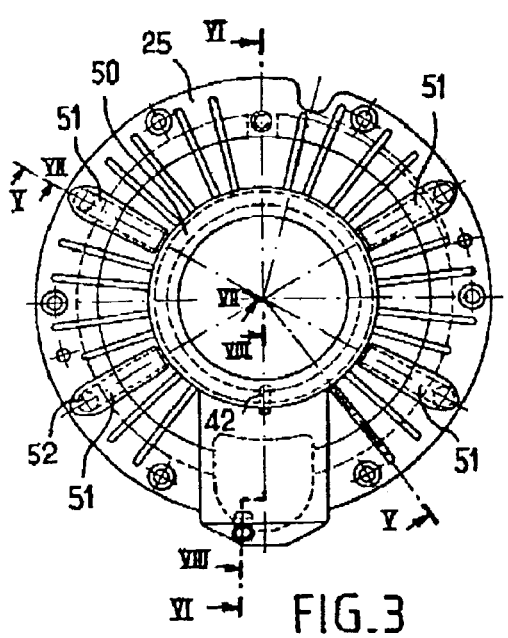
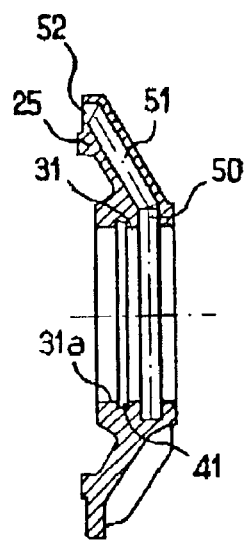
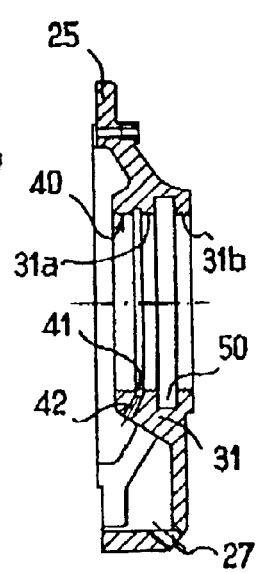
FIG. 3
FIG. 5
FIG. 6

BEARING ASSEMBLY INCLUDING ROLLING ELEMENTS

The present invention relates to the field of bearings and more particularly to an assembly comprising a cage and rolling elements placed inside the cage, said rolling elements being designed to support a shaft passing through the cage, the cage having sealing parts on either side of the rolling elements.

BACKGROUND OF THE INVENTION

In conventional manner, the sealing parts may comprise portions in relief such as fluting enabling lubricants to be retained inside the cage, particularly when the shaft rotates at high speed and gaskets pressing against the shaft cannot be used.

OBJECTS AND SUMMARY OF THE INVENTION

The invention seeks to improve the reliability of rolling elements, making it possible in particular to reduce the risk of lubricant leaking through the sealing parts, particularly when air pressure is not the same on both sides of the cage, as occurs for example when the cage is mounted on the endplate of a rotary electric machine and the machine has a fan turning inside the casing of the machine.

In one of its aspects, the invention thus provides an assembly comprising a cage and rolling elements placed inside the cage, the rolling elements supporting a shaft passing through said cage, the cage having sealing parts extending on either side of said rolling elements, the assembly including at least one communication path between two spaces formed between said sealing parts and the shaft.

The above-mentioned communication path makes it possible to reduce the risk of lubricant being entrained by a flow of air passing between the shaft and at least one of the sealing parts.

The spaces formed between the sealing parts and the shaft may be defined, for example, by annular grooves in the sealing parts.

The sealing parts preferably make no contact with the shaft.

The sealing parts may include portions in relief such as fluting. By way of example, the assembly may include portions in relief such as fluting on either side of said spaces for retaining the lubricant in the cage.

The fluting may be helical, for example.

The above-mentioned communication path may comprise channels made inside the walls of the cage, for example.

By way of example, the cage may comprise at least two half-shells, also referred to as cage plates, disposed respectively on either side of the rolling elements.

By way of example, each half-shell may be formed integrally with a sealing part, e.g. by casting.

The above-mentioned communication path may comprise at least one inside channel made in at least one of the half-shells.

In a particular embodiment of the invention, the cage includes an intermediate piece between the two half-shells. This intermediate piece may serve as a support for a ring, with the rolling elements rolling in contact therewith.

The communication path may comprise at least one channel made in the intermediate piece, for example four channels.

The intermediate piece may also include at least one channel enabling lubricant to flow between two regions of the cage situated on either side of the rolling elements. By way of example, this channel may have its axis inclined at a non-zero angle relative to the axis of the shaft so as to enable lubricant sprayed into the cage to flow towards an emptying orifice.

By way of example, the intermediate piece may be arranged to be fixed on the endplates of an electric machine casing.

At least one of the sealing parts may include a lubricant recovery groove, said groove being disposed between sets of fluting opening out to the shaft and in communication via at least one channel with the inside of the cage.

In an embodiment of the invention, the rolling elements may comprise balls. In the example described, the assembly may comprise two rings between which the rolling elements roll, one of the rings being in contact with the shaft and the other ring being in contact with the cage, for example in contact with the above-mentioned intermediate piece when such a piece is present.

In an embodiment of the invention, the assembly is adapted to receive a sprayer member for spraying lubricant inside the cage.

The diameter of the shaft level with the bearings may be greater than or equal to 50 millimeters (mm), and in particular greater than or equal to 100 mm.

In a particular embodiment of the invention, the cage has a low point with an orifice for emptying out the lubricant.

In operation, the cage may be filled at least in part with a lubricant such as oil, for example.

The invention also provides a rotary machine including at least one assembly as described above. By way of example, the machine may have a fan inside a machine casing, which fan may be rotated by the shaft, for example.

The machine may include at least one duct opening out firstly into said at least one communication path and secondly to the inside of the casing of the machine, at the outlet from the fan.

BRIEF DESCRIPTION OF THE DRAWINGS

The invention will be better understood on reading the following detailed description of non-limiting embodiments thereof, and on examining the accompanying drawings, in which:

FIG. 2 is an end view as seen looking along arrow II of FIG. 1 showing the inside half-shell of the cage;

FIG. 3 is an end view as seen looking along arrow III of FIG. 1, showing the outside half-shell of the cage;

FIG. 4 is a diagrammatic section on IV—IV of FIG. 2;

FIG. 5 is a diagrammatic section on V—V of FIG. 3;

FIG. 6 is a diagrammatic section on VI—VI of FIG. 3;

MORE DETAILED DESCRIPTION

Throughout the description below, including in the claims, the term "comprising a" should be understood as meaning "comprising at least one" unless the contrary is specified.

Figure 1:
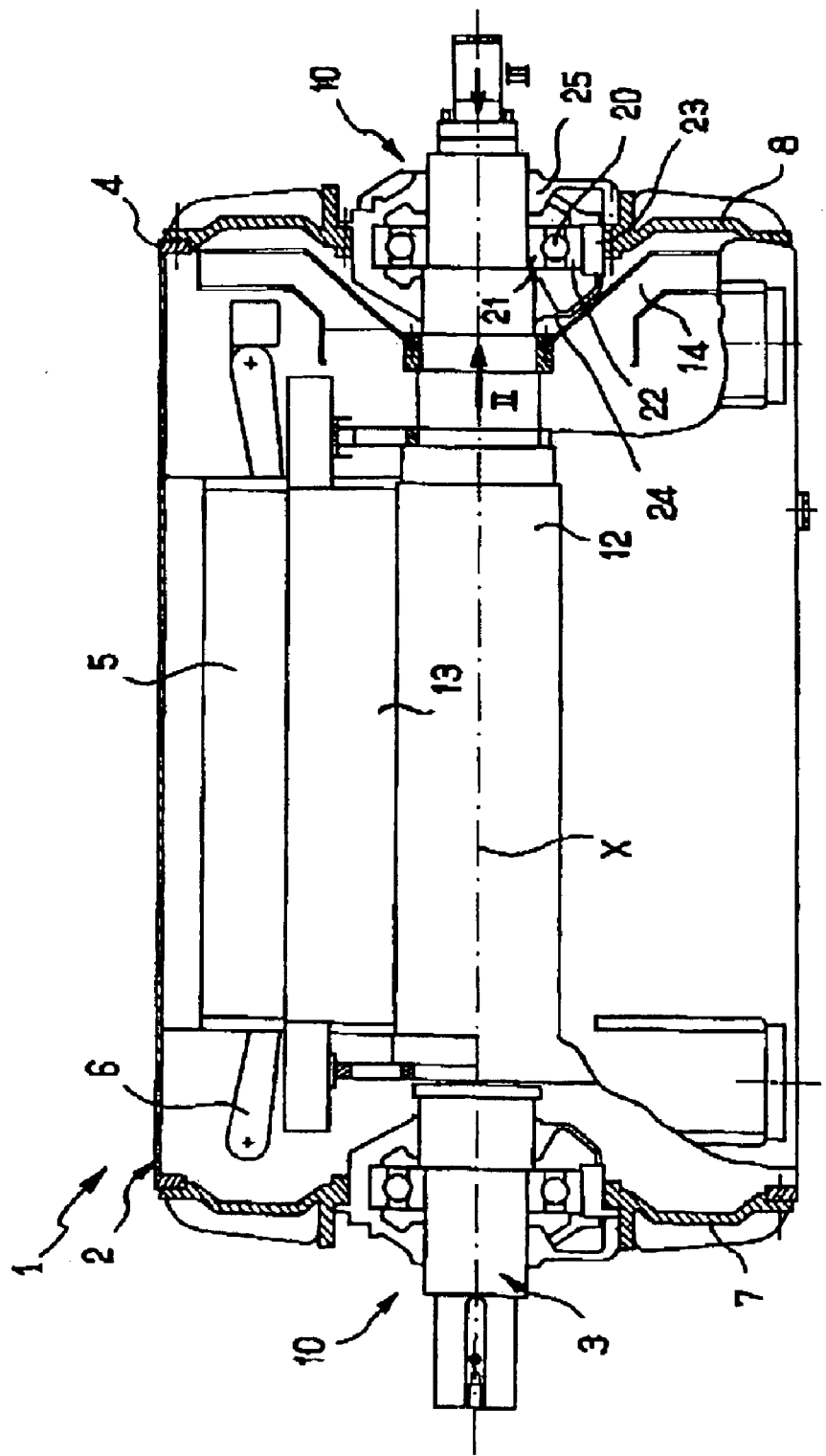
FIG. 1 is a diagrammatic and fragmentary view of an electrical machine to which the invention can be applied, with certain component parts being shown in axial section.

FIG. 1 shows an electric machine 1 comprising a stator 2 and a rotor 3 rotatable about an axis X.

The stator 2 comprises a casing 4 having a magnetic circuit 5 disposed therein, which circuit comprises coils 6 and a stack of magnetic laminations in conventional manner.

The casing 4 has endplates 7 and 8, each supporting an assembly 10 containing rolling elements. The two assemblies 10 are shown highly diagrammatically and in part only in FIG. 1, in order to clarify the drawing. The two assemblies 10 are disposed symmetrically to each other about a midplane perpendicular to the axis X.

The rotor 3 comprises a shaft 12 carrying a magnetic circuit 13 comprising a stack of magnetic laminations and a fan 14 serving to generate a flow of cooling air inside the machine.

Each assembly 10 comprises rolling elements 20 (constituted by balls in the example described) rolling between two rings 21 and 22, the radially inner ring 21 being in contact with the shaft 12 and the radially outer ring 22 being in contact with an intermediate piece 23 disposed between an inside half-shell 24 and an outside half-shell 25, the half-shells 24 and 25 and the intermediate piece 23 constituting a cage housing the rolling elements 20.

While the machine is in operation, in order to lubricate the rolling elements 20, a lubricant is continuously sprayed inside the cage by at least one sprayer member (not shown).

By way of example, the lubricant used is oil.

Figures 8, 9:
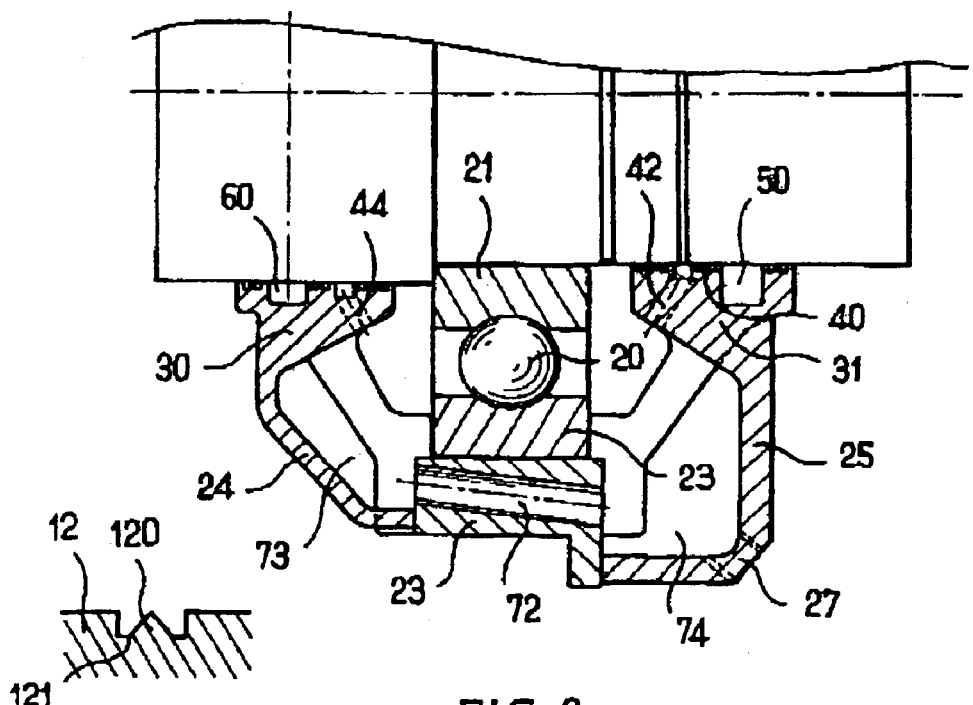
FIG. 8 is a diagrammatic overall axial half-section with the inside and outside half-shells in section on VIII—VIII of FIGS. 2 and 3.
FIG. 9 shows a detail of the shaft.

The oil sprayed inside the cage can be collected at a low point thereof via an emptying orifice 27, which can be seen in FIG. 8.

The half-shells 24 and 25 have respective annular sealing parts 30 and 31.

Each sealing part 30 or 31 extends without making contact with the shaft and includes portions in relief 40 for opposing departure of lubricant through the clearance that exists between the sealing parts and the shaft.

In the example shown, these portions in relief 40 comprise helical fluting. The sealing part of the outside half-shell 25 may thus comprise, for example, helical fluting 31a, 31b constituted by a triangular ISO (International Standards Organization) screw having a left-hand pitch of 5 mm. A lubricant recovery groove 41 is formed in the threaded part 31a and communicates with the inside of the cage via a channel 42, as can be seen in FIG. 6.

The sealing part 30 of the inside half-shell 24 also has a threaded portion 30a, 30b and a similar recovery groove 43 communicating via a channel 44 with the inside of the cage, as can be seen in FIG. 4.

Facing each of the lubricant recovery grooves 41 or 43, the shaft has an annular ridge 120 situated in the bottom of a groove 121, the ridge 120 serving to throw lubricant present on the shaft under centrifugal force into the recovery groove.

The handedness of the threads is selected as a function of the direction of rotation of the machine so as to ensure that the fluting tends to return the lubricant towards the cage.

An annular groove 50 is made in the sealing part 31 and is open towards the shaft 12. This groove 50 communicates with channels 51, there being four of these channels in the example shown, each of the channels 51 opening via an orifice 52 into the edge of the outside half-shell 25, as can be seen in FIG. 5.

In similar manner, the inside half-shell 24 has a groove 60 communicating channels 61, there being four such channels in the example shown, with corresponding orifices 62 opening out in its edge.

The orifices 52 are disposed symmetrically about a vertical midplane, as can be seen in FIG. 3. The same applies to the orifices 62.

It should be observed that both for the inside half-shell 24 and for the outside half-shell 25, the sealing parts 30 and 31 have respective regions 30b and 31b which extend at a small distance from the shaft and which are provided with portions in relief such as helical fluting, for example, these regions 30b and 31b extending between the grooves 60 or 50 and the end of the corresponding half-shell that is remote from the other half-shell.

Figure 7:
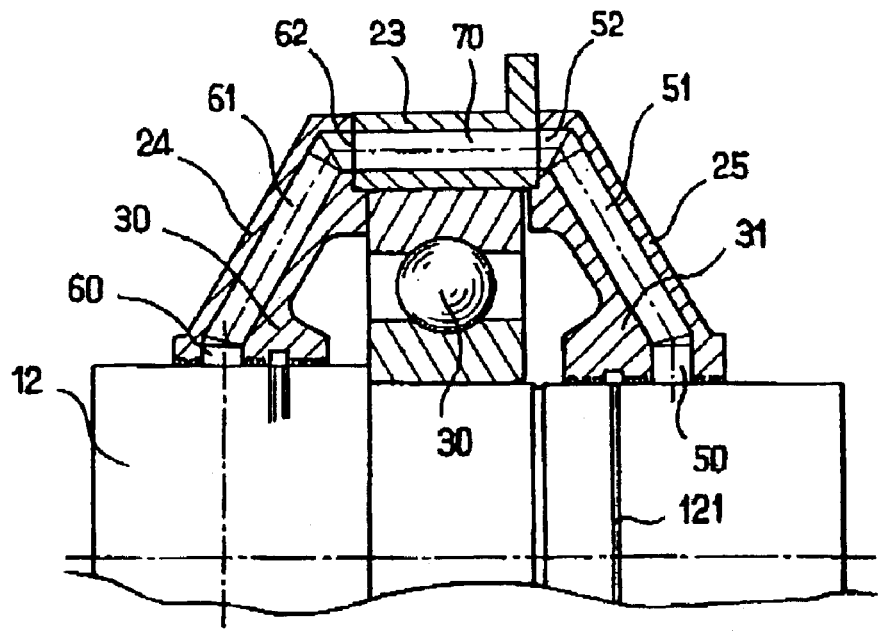
FIG. 7 is a diagrammatic overall axial half-section showing the inside and outside half-shells in section on VII—VII of FIGS. 2 and 3.

The channels 51 and 61 communicate with each other via channels 70 made through the intermediate piece 23, there being four such channels in the example shown, these channels having ends that open out in register with the orifices 52 and 62, as can be seen in FIG. 7.

The intermediate piece 23 also has at least one channel 72 enabling a communication path to be established between two regions 73 and 74 of the cage situated on either side of the rolling elements 20, as can be seen in FIG. 8. The channel 72 enables the lubricant to flow towards the emptying orifice 27.

The channels 51, 61, and 70 enable a communication path to be established between the grooves 50 and 60, thus making it possible to reduce the risks of lubricant leaking while the machine 1 is in operation.

The fan 14 establishes reduced pressure inside the assembly 10 adjacent thereto beside the inside half-shell 24.

In the absence of the above-specified communication path, lubricant would be entrained by the air flowing along the clearance between the shaft and the sealing parts 30 and 31 due to the above-mentioned reduced pressure.

The communication path between the grooves 50 and 60 serves to remedy this problem by balancing the pressures.

In similar manner, for the assembly 10 situated on the left-hand side of the machine in the figure, the fan 14 establishes increased pressure beside the assembly 10 adjacent to its inside half-shell 24. In the absence of the above-mentioned communication path, lubricant would be entrained by air flowing between the shaft and the sealing parts.

To reduce the leakage of air from the cage towards the fan 14 along the shaft 12, it is possible to establish a communication path between the channels 51, 61, and 70 and the inside of the casing.

Figure 10:
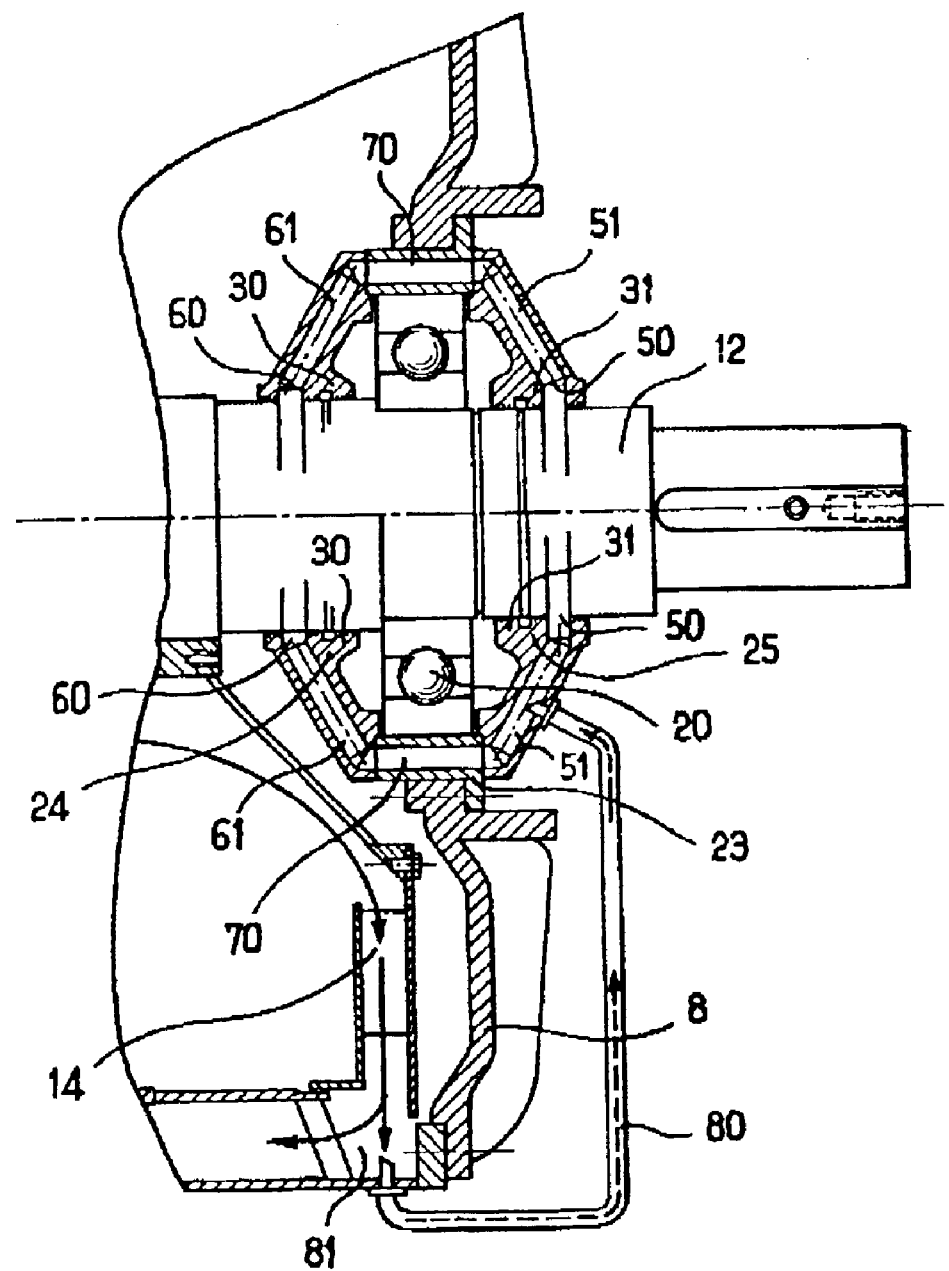
FIG. 10 is a diagrammatic and fragmentary section view of a variant embodiment.

By way of example, FIG. 10 shows a duct 80 opening out firstly to the outlet 81 of the fan 14 inside the casing, and secondly to the channel 51 in the outside half-shell 25 of the assembly 10 situated beside the fan 14.

This duct 80 enables air coming from the fan 14 to be taken into the grooves 50 and 60 on either side of the bearing, and to drive any oil tending to flow towards the reduced pressure created by the fan 14 outside the assembly 10 back towards the bearing.

The presence of the duct 80 is particularly advantageous when the machine is operated at an angle tending to cause the lubricant to flow towards the fan 14, or if there exist relatively large pressure differences between the outside and the inside of the machine beside the fan 14, particularly if its speed of rotation is high.

Naturally, the invention is not limited to the embodiment described above.

In particular, the balls 20 could be replaced by other rolling elements such as, for example: needles, cylindrical rollers, or conical rollers.

The rolling elements may be designed to take up forces that are purely radial, or else both radial and axial.

The invention can be applied to machines other than rotary electric machines, and in particular it can be applied to heat engines.

Without going beyond the ambit of the present invention, the half-shells can be given shapes that are different from those shown, and in particular it is possible to make an assembly in accordance with the invention having only two half-shells assembled against each other without any intermediate piece.

The inside channels of the cage may be replaced by channels built up using separate pieces fitted thereto. The channels may be of various sections, circular, or otherwise.

The portions in relief for preventing the lubricant from leaving the cage may be portions in relief other than helical fluting. The profile of the fluting may be triangular or otherwise, in particular it may be rectangular or trapezoidal.

What is claimed is:

1. An assembly, comprising:
   a cage;
   rolling elements placed inside the cage;
   a shaft passing through said cage and supported by the rolling elements, the cage having sealing parts extending on either side of said rolling elements;
   two spaces formed between said sealing parts and the shaft; and
   at least one communication path between the two spaces, wherein the sealing parts include fluting.

2. An assembly according to claim 1, wherein said spaces are defined by annular grooves in the sealing parts.

3. An assembly according to claim 1, wherein the sealing parts do not make contact with the shaft.

4. An assembly according to claim 1, comprising portions in relief on either side of each said spaces.

5. An assembly according to claim 1, wherein said cage has walls and wherein said at least one communication path comprises channels made inside the walls of the cage.

6. An assembly according to claim 1, wherein the cage comprises at least two half-shells disposed respectively on either side of said rolling elements.

7. An assembly according to claim 6, wherein each half-shell is made integrally with a sealing part.

8. An assembly according to claim 6, wherein the communication path comprises at least one inner channel made in at least one of the half-shells.

9. An assembly according to claim 6, wherein the cage includes an intermediate piece between the two half-shells.

10. An assembly according to claim 9, wherein the communication path comprises at least one channel made in the intermediate piece.

11. An assembly according to claim 9, wherein the intermediate piece is arranged to be fixed to the endplates of an electric machine casing.

12. An assembly according to claim 1, wherein the rolling elements comprise balls.

13. An assembly according to claim 12, including two rings between which the rolling elements roll, one of the rings being in contact with the shaft, and the other ring being in contact with the cage.

14. An assembly according to claim 1, the assembly being adapted to receive a member for spraying lubricant inside the cage.

15. An assembly according to claim 1, wherein the diameter of the shaft level with the rolling elements is greater than or equal to 50 mm.

16. An assembly according to claim 15, wherein the diameter of the shaft level with the rolling elements is greater than or equal to 100 mm.

17. An assembly according to claim 1, wherein the cage has a low point with a lubricant emptying orifice.

18. An assembly according to claim 1, wherein in operation the cage is filled at least in part by an oil.

19. A rotary machine, comprising at least one assembly according to claim 1.

20. A machine according to claim 19, including a casing and a fan inside the casing.

21. A machine according to claim 20, wherein the fan is rotated by the shaft of the machine.

22. An assembly comprising:
    a cage;
    rolling elements placed inside the cage;
    a shaft passing through said cage and supported by the rolling elements, the cage having sealing parts extending on either side of said rolling elements;
    two spaces formed between said sealing parts and the shaft; and
    at least one communication path between the two spaces, wherein the sealing parts comprise fluting on either side of each of said spaces.

23. An assembly, comprising:
    a cage;
    rolling elements placed inside the cage;
    a shaft passing through said cage and supported by the rolling elements, the cage having sealing parts extending on either side of said rolling elements;
    two spaces formed between said sealing parts and the shaft; and
    at least one communication path between the two spaces, wherein the cage comprises at least two half-shells disposed respectively on either side of said rolling elements, and each half-shell is made integrally with a sealing part by casting.

24. An assembly, comprising:
    a cage;
    rolling elements placed inside the cage;
    a shaft passing through said cage and supported by the rolling elements, the cage having sealing parts extending on either side of said rolling elements;
    two spaces formed between said sealing parts and the shaft; and
    at least one communication path between the two spaces, wherein the cage comprises at least two half-shells disposed respectively on either side of said rolling elements, the cage includes an intermediate piece between the two half-shells, and the communication path comprises at least four channels made in the intermediate piece.

25. An element, comprising:
    a cage;
    rolling elements placed inside the cage;
    a shaft passing through said cage and supported by the rolling elements, the cage having sealing parts extending on either side of said rolling elements;

two spaces formed between said sealing parts and the shaft; and at least one communication path between the two spaces, wherein the cage comprises at least two half-shells disposed respectively on either side of said rolling elements, the cage includes an intermediate piece between the two half-shells, and said intermediate piece includes at least one channel enabling lubricant to circulate between two regions of the cage situated on either side of the rolling elements.

26. An assembly according to claim 25, wherein said at least one channel extends along an inclined axis at a non-zero angle relative to the axis of the shaft.

27. An assembly, comprising:

a cage;

rolling elements placed inside the cage;

a shaft passing through said cage and supported by the rolling elements, the cage having sealing parts extending on either side of said rolling elements;

two spaces formed between said sealing parts and the shaft; and at least one communication path between the two spaces, wherein at least one of the sealing parts includes a lubricant recovery groove, said groove being disposed between sets of fluting opening out to the shaft and communicating via at least one channel with the inside of the cage.

28. An assembly, comprising:

a cage;

rolling elements placed inside the cage;

a shaft passing through said cage and supported by the rolling elements, the case having sealing parts extending on either side of said rolling elements;

two spaces formed between said sealing Parts and the shaft; and at least one communication path between the two spaces, wherein at least one of the sealing parts has helical fluting.

29. A rotary machine, comprising at least one assembly comprising:

a cage;

rolling elements placed inside the cage;

a shaft passing through said cage and supported by the rolling elements, the cage having sealing parts extending on either side of said rolling elements;

two spaces formed between said sealing parts and the shaft; and at least one communication path between the two spaces, said machine comprising at least one duct opening out both into said at least one communication path and into an inside of the casing of the machine, at an outlet of the fan.

30. A machine, comprising:

a cage;

rolling elements placed inside the cage;

a shaft passing through said cage and supported by the rolling elements, the cage having sealing parts extending on either side of said rolling elements;

two spaces formed between said sealing parts and corresponding surfaces of the shaft; and at least one communication path between the two spaces, wherein the corresponding surfaces are monolithic with the shaft.

* * * * *